(12) United States Patent
Ragnarsson

(10) Patent No.: US 10,029,282 B2
(45) Date of Patent: Jul. 24, 2018

(54) ADJUSTMENT MECHANISM FOR GRADING SYSTEMS

(71) Applicant: STYLE EHF., Gardabaer (IS)

(72) Inventor: Egill Thor Ragnarsson, Gardabaer (IS)

(73) Assignee: STYLE EHF, Gardabaer (IS)

(*) Notice: Subject to any disclaimer, the term of this patent is extended or adjusted under 35 U.S.C. 154(b) by 0 days.

(21) Appl. No.: 15/326,285

(22) PCT Filed: Jul. 16, 2015

(86) PCT No.: PCT/IS2015/050013
§ 371 (c)(1),
(2) Date: Jan. 13, 2017

(87) PCT Pub. No.: WO2016/009452
PCT Pub. Date: Jan. 21, 2016

(65) Prior Publication Data
US 2017/0203334 A1    Jul. 20, 2017

(30) Foreign Application Priority Data
Jul. 16, 2014    (IS) .......................................... 050087

(51) Int. Cl.
*B07B 13/18*    (2006.01)
*B07B 13/065*   (2006.01)
*A22C 25/04*    (2006.01)

(52) U.S. Cl.
CPC ............ *B07B 13/065* (2013.01); *B07B 13/18* (2013.01); *A22C 25/04* (2013.01)

(58) Field of Classification Search
CPC ....... B07B 13/065; B07B 13/07; B07B 13/18; A22C 25/04; A22C 25/08

USPC ......................... 209/621, 622, 665, 668, 670
See application file for complete search history.

(56) References Cited

U.S. PATENT DOCUMENTS

| 282,719 A | * | 8/1883 | Gunckel | B07B 1/14 |
| | | | | 209/394 |
| 1,325,505 A | * | 12/1919 | Bong | B07B 1/12 |
| | | | | 209/394 |
| RE21,376 E | * | 2/1940 | Sjoberg | B26D 1/52 |
| | | | | 74/424.72 |

(Continued)

FOREIGN PATENT DOCUMENTS

| WO | WO96/41541 | 12/1996 |
| WO | WO2006/120706 A1 | 11/2006 |

*Primary Examiner* — Joseph C Rodriguez
(74) *Attorney, Agent, or Firm* — Muncy, Geissler, Olds & Lowe, PC

(57) ABSTRACT

An apparatus and method for grading sensitive products. The apparatus and method treat the objects to be graded gently and are accurate and may be constructed so as to handle extremely large quantities. The grading device has grading channels that are wider at the outlet than at the intake. The belt machine draws the objects forward between two inclined belts which form the channel. An adjusting device is implemented perpendicular underneath the belts of the apparatus having alternatively arranged support members and adjusting members arranged on an adjusting screwing shaft. Both components have screwing sections which regulate an increase or a decrease in the gap between the support members when the adjusting screwing shaft is rotated.

19 Claims, 8 Drawing Sheets

(56) References Cited

U.S. PATENT DOCUMENTS

| | | | | |
|---|---|---|---|---|
| 4,723,660 | A * | 2/1988 | Sjoberg | B07B 13/065 209/622 |
| 5,012,688 | A * | 5/1991 | Ellis | B07B 1/14 74/89.23 |
| 5,513,741 | A * | 5/1996 | Ellis | B07B 1/14 193/35 TE |
| 6,305,553 | B1 * | 10/2001 | Tirschler | B07B 1/14 209/606 |
| 6,321,914 | B1 * | 11/2001 | Magnusson | A22C 25/04 209/622 |
| 8,162,150 | B2 * | 4/2012 | Ragnarsson | A22C 25/00 209/665 |
| 8,322,515 | B2 * | 12/2012 | Rausch | B65G 47/086 198/436 |
| 8,720,695 | B2 * | 5/2014 | Greve | B07B 1/14 209/240 |
| 8,763,815 | B2 * | 7/2014 | Pellenc | B07B 1/15 209/668 |

* cited by examiner

ADJUSTMENT MECHANISM FOR GRADING SYSTEMS

BACKGROUND OF THE INVENTION

Field of the Invention

The present invention relates grading systems for grading objects, based on conveyor equipment with ridge-belts. The device and the method make possible to adjust the gap width of such grading systems more precisely and accurately than current technology allows.

Brief Discussion of the Related Art

The process of grading objects such as small and delicate marine species or fruit can be a problem due to their small size and the volume to be processed at each time and the fact that the quality of the food items deteriorates quickly upon rough handling procedures. An efficient grading process is therefore required based on selection criteria such as size and/or the sex.

Several different types of grading devices are known for grading fish and food items, which grade the items according to an assessment of their thickness. The known devices are based on belts and rollers as well as shaker-graders, which use several grading channels.

WO9641541 discloses a grading device based on specially-designed conveyor equipment so-called ridge-belts, which move the objects forwards without shaking or rubbing the items during the grading process. Such grading devices are designed so that the grading channels are narrower at the in-feed end (receiving end) than at the outlet end. This device allows for more gentle treatment of the objects to be graded, with a high processing rate. The problem solved by using this grading device is that the material is arranged into a single layer in optimal position onto the grading apparatus. This ensures that small items are not carried on top of larger items into a wrong grading compartment.

The adjustment of the channel width both at the intake and the outlet end is an important aspect of this technology. The channel width is set before the grading process is started, but sometimes the channel width needs to be adjusted or fine-tuned during the grading process. This requires a solution, where the channel width can be set before and during the grading process in a manner such that the channel width is the same between in all the channels on the grading device. WO 2006/120706 discloses a setting device being a more efficient solution to set and adjust or fine-tune the channel width of ridge-belts of grading devices in a more precise and accurate manner. The setting or adjusting device is implemented perpendicular underneath the belts of the apparatus comprising alternatively arranged support members and adjusting members arranged on an adjusting screwing shaft. Both components comprise screwing sections which regulates an increase or a decrease in the gap between the support members when the adjusting screwing shaft is rotated. A problem with this technology is that the various components of the adjusting device, especially the components that interact with each other by a screwing mechanism collect debris, particles, dirt and water which affects the adjusting or setting mechanism and can affect the mechanism and are the perfect setting for bacterial growth.

SUMMARY OF THE INVENTION

The objective of the present invention is to provide a method and a device for optimal adjustment of grading devices, which treat the objects to be graded gently and to provide a mechanism which is more accurate and easy to clean. The grading device of the present invention has grading channels that are wider at the outlet than at the intake. The belt machine draws the objects forward between two inclined belts which form the channel, and if more channels are included in the same machine, each additional channel consists of an independent unit, i.e. another machine which is placed next to the first one. The machine takes the form of a conveyor belt which neither shakes the objects nor rubs them in the course of moving them, but moves them gently forward until the point where the gap becomes large enough for the object to fall through it.

The present invention in useful in industry, not only for the purpose of enabling the currently existing equipment to operate at the ideal level of throughput, but also as a new standard of concentration control for which future devices can be designed to exploit.

It is an object of the present invention to overcome or ameliorate the aforementioned drawbacks of the prior art and to provide an improved and/or alternative and/or additional device for automatic and continuous for grading of sensitive products, comprising an in-feed device, a grading unit and receiving unit, where the grading unit comprises a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails. It is one preferred object of the present invention to provide a device comprising An adjusting device is arranged underneath the ridge-belts and supporting guide rails, the adjusting device arranged for adjusting the distance between the ridge-belts. Moreover, it is a preferred object of the present invention to provide a setting or adjusting device comprising alternatively arranged support members and adjusting members arranged on an adjusting screwing shaft, where both components comprise screwing sections which regulate an increase or a decrease in the gap between the support members when the adjusting screwing shaft is rotated. It is also a preferred object of the present invention to provide an adjustment device comprising a cover portion to seal off the joining region of the support member and the adjusting screwing member.

The object(s) underlying the present invention is (are) particularly solved by the features defined in the independent claims. The dependent claims relate to preferred embodiments of the present invention. Further additional and/or alternative aspects are discussed below.

It is the use of a cover member for protecting the joining region of the support members and the adjusting screwing members from impurities and debris, which provides the improved device and method resulting in a more better sorting and maintenance of the grading device. Not only does the invention provide the cover members for protection of the joining regions, but also a shorter and wider design of the guide section of the support member to reduce the space between the guide bar and the cover member for minimising the risk of objects being stuck in the gap during sorting. Furthermore, an improvement is provided in the supporting pin of the support member is made from two pieces a pin a plastic cap placed over the pin for reducing wear on the ridge belts during use. In addition to the above, a hollow structure in the guide section of the first screwing section provides an outlet from the inner side of the first screwing section through the guide section to evacuate fluid therefrom.

The grading device as such is disclosed in WO9641541 and will not be discussed in detail herein.

Thus, at least one of the preferred objects of the present invention is solved by an apparatus for grading of sensitive products, comprising an in-feed device, a grading unit and receiving unit. The grading unit comprises the following components: 1) A plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails, and 2) an adjusting device is arranged underneath the ridge-belts and supporting guide rails, the adjusting device being arranged for adjusting the distance between the ridge-belts. The adjusting device comprises; a) a plurality of support members, arranged in line, perpendicular underneath and corresponding to and supporting the guide rails, the support members. The support member further comprises a first screwing section, the first screwing section being a double action inner elevated portion of a cylinder forming a screw tread structure extending from the centre of the cylinder and towards each opening, b) a plurality of adjusting screwing members, arranged in line, perpendicular underneath the guide rails between the support members. The adjusting screwing member further comprises a second screwing section being a double action outer elevated portion of a cylinder forming a screw tread structure extending from the centre of the cylinder and towards each end and an inner hollow structure providing a grip for a penetrating object adapted to rotate the adjusting screwing member, c) adjusting screwing shaft, penetrating the adjusting screwing member having a shape fitting or matching or corresponding to the circumference of the inner hollow structure of the adjusting screwing member, and d) a cover portion, said cover member being a pipe shaped member having an edge on each side forms a protrusion or a ring with larger circumference to fit into a groove on the support member to seal off the joining region of the support member and the adjusting screwing member. The second screwing member interacts with said first screwing section of the support members upon rotation of said adjusting screwing shaft in a manner increasing or decreasing the distance between adjacent support members and thereby said guide rails and said rigid belts.

Adjusting screwing members and support members are alternatively lined up underneath the guide rails. The second screwing member interacts with the first screwing section of the support members upon rotation of the adjusting screwing shaft in a manner increasing or decreasing the distance between adjacent support members and thereby the guide rails and the rigid belts. The inner hollow structure of the adjusting screwing member provides a grip for the adjusting screwing shaft adapted to rotate the adjusting screwing member, where the adjusting screwing shaft penetrating the adjusting screwing member has a shape corresponding to the circumference of the inner hollow structure of the adjusting screwing member. This means that if the shaft has a hexagonal outer circumference (se FIG. 2) the circumference of the inner hollow structure of the adjusting screwing member is hexagonal as well to provide the grip.

The adjusting device of the present invention relates to adjusting screwing members and support members being alternatively lined up on an adjusting screwing shaft. Both the adjusting screwing members and support members have counter fitting screwing sections and pressure means are placed on each end of the adjusting screwing shaft.

The support members of the present invention relate to items, which support the guide rails as they pass the upper part of the grading device. The support member comprises a screwing section, which will receive a counter fitting screwing section of an adjusting screwing member. The screwing section in the embodiment shown in FIG. 2 is a cylindrical like member as disclosed above. The support member further comprises a guide section, which secures the support member in an upright, vertical position in order to hold up the guide rails and receiving section for receiving the guide rails. The guide section can be two flat parallel pieces (as shown in FIG. 2) extending downwards from the screwing section forming a space to fit around a guide bar extending parallel to the adjusting device. The guide section can also be a hollow piece having an inner shape being circular, oval, triangular, square, hexagonal etc., which a holding bar can be put through to maintain the upright position of the support member. The receiving section of the support member is designed to fit into the lower section of the guide rails. In the embodiment shown in FIG. 3 the lower section of the guide rails is V-shaped, and thus the receiving section of the support member has a narrow triangular or conical shape.

In an embodiment of the present invention the receiving section is a supporting pin forming the supporting portion of the support member and having a shape corresponding to the guide rails. The support pin may comprise a metal pin screwed into the support member and a cap is placed over the first pin. The cap of the pin is made from material such as, but not limited to POM, plastic etc.

In an embodiment of the present invention the guide section comprises a hollow pin screwed into the first screwing section and a cap with a recess placed on the hollow pin. The hollow pin comprises an outlet from the inner side of the first screwing section through the guide section. The cap of the guide section is made from material such as, but not limited to POM, plastic etc.

The adjusting device of the present invention may comprise a control device attached to the adjusting screwing shaft adapted for turning the adjusting screwing shaft and thereby increasing or decreasing the gap between the ridged belts. The control device can be a manual member such as a steering wheel, winch or the like, or it can be a motor.

The pressure means of the present invention relate to means placed on each end of the adjusting screwing shaft, which are adapted for applying pressure on the support members and the adjusting screwing members of the adjusting device from both sides. By applying pressure on the row of adjusting screwing members and support members, a rotation of the adjusting screwing shaft will allow the adjusting screwing members to either push the support members apart or together. The pressure can be applied by means of a coil spring or a spiral as well as an electrical jack or a hydraulic jack. The grading gap interval is thereby altered by the width of the adjusting screwing members and the width of the ridge-belts.

Although the screw thread of the support member (10) and the adjusting screwing member (12) according to the present invention is finer than presented in the prior art devices, the elastic properties of the cover member (13) apply a pushing and a pulling force between the support and adjusting members giving a more sensitive and accurate adjustment of the space between the support members and thereby the space between the ridge belts. Due to the nature of the device and the tasks it performs liquid and all sorts of debris will wash over the belts and remaining components of the grading apparatus.

Furthermore, one of the problems being solved by changing the design of the guide section of the support member, where the guide section is designed to be short and wide. This reduces the space between the guide bar and the cover member, thereby minimising the risk of objects like small fish being stuck in there during sorting.

Another preferred object of the present invention is solved by a method for adjusting the gap width between ridge-belts of a grading device is provided. The grading device comprises an in-feed device, a grading unit and a receiving unit. The grading unit comprises a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails. The grading unit further comprises an adjusting device arranged underneath the ridge-belts and supporting guide rails, the adjusting device is arranged for adjusting the distance between the ridge-belts. The adjusting device comprises a) a plurality of support members, arranged in line, perpendicular underneath and corresponding to and supporting the guide rails, the support members. The support members further comprises a first screwing section, the first screwing section being a double action inner elevated portion of a cylinder forming a screw tread structure extending from the centre of the cylinder and towards each opening, b) a plurality of adjusting screwing members, arranged in line, perpendicular underneath said guide rails between the support members. The adjusting screwing member further comprises a second screwing section being a double action outer elevated portion of a cylinder forming a screw tread structure extending from the centre of the cylinder and towards each end and an inner hollow structure providing a grip for a penetrating object adapted to rotate the adjusting screwing member, c) adjusting screwing shaft, penetrating said adjusting screwing member having a shape fitting the circumference of the inner hollow structure of the adjusting screwing member, and a cover portion, said cover member being a pipe shaped member having an edge on each side forms a protrusion or a ring with larger circumference to fit into a groove on the support member to seal off the joining region of the support member and the adjusting screwing member. The gap width between the ridge-belts is determined by the adjusting device in that first screwing section of the support member is adapted to fit second screwing section of the adjusting screwing member on each side of the adjusting screwing member, and pressure means on each end of the adjusting screwing shaft adapted for applying pressure on the adjusting device from both sides when the adjusting screwing shaft is rotated in a manner increasing or decreasing the distance between adjacent support members and thereby said guide rails and said rigid belts.

According to the present invention one or more adjusting devices can be implemented on the grading apparatus, such as at the intake end and the outlet end of the grading apparatus. For example, one adjusting device can be placed at the intake end and another one in the middle of the device forming a small increase in gap width to the second adjusting device. A third adjusting device is then place at the outlet end of the grading apparatus with much larger gap width. This will allow for grading of smaller size objects into several categories and the collection of larger objects into one or two categories.

A control device or control mechanism is implemented on the adjusting device, coupled or attached to the adjusting screwing shaft, so that when the shaft is turned, the gap width is evenly adjusted. A control mechanism may comprise components such as, but not limited to; pressure means, f ex. an electrical jack or a hydraulic jack; a motor, and a control board.

The gap size is then set by using the control board, which can be a simple electrical control board attached to the grading device, having control buttons which rotate the adjusting screwing shaft in each direction as well as controlling the speed of the grading device and the in-feed device. The control board can further be a wireless remote control or an industrial computer, which co-ordinates the turning of the adjusting screwing shaft by the motor and the pressure applied by the pressure means.

The shape of the adjusting screwing shaft and the corresponding circumference of the inner surface of the adjusting screwing member can be of any shape such as, but not limited to triangular, square, pentagonal etc.

An adjustment device as disclosed here is implemented on the in-feed end as well as on the outlet end of the grading device and as they are individually controlled, the gap width of each end can be altered without affecting the other.

BRIEF DESCRIPTION OF THE DRAWINGS

The present invention will be further described with reference to the drawings using reference numbers in the drawings to identify the individual components of the invention.

DETAILED DESCRIPTION OF THE INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
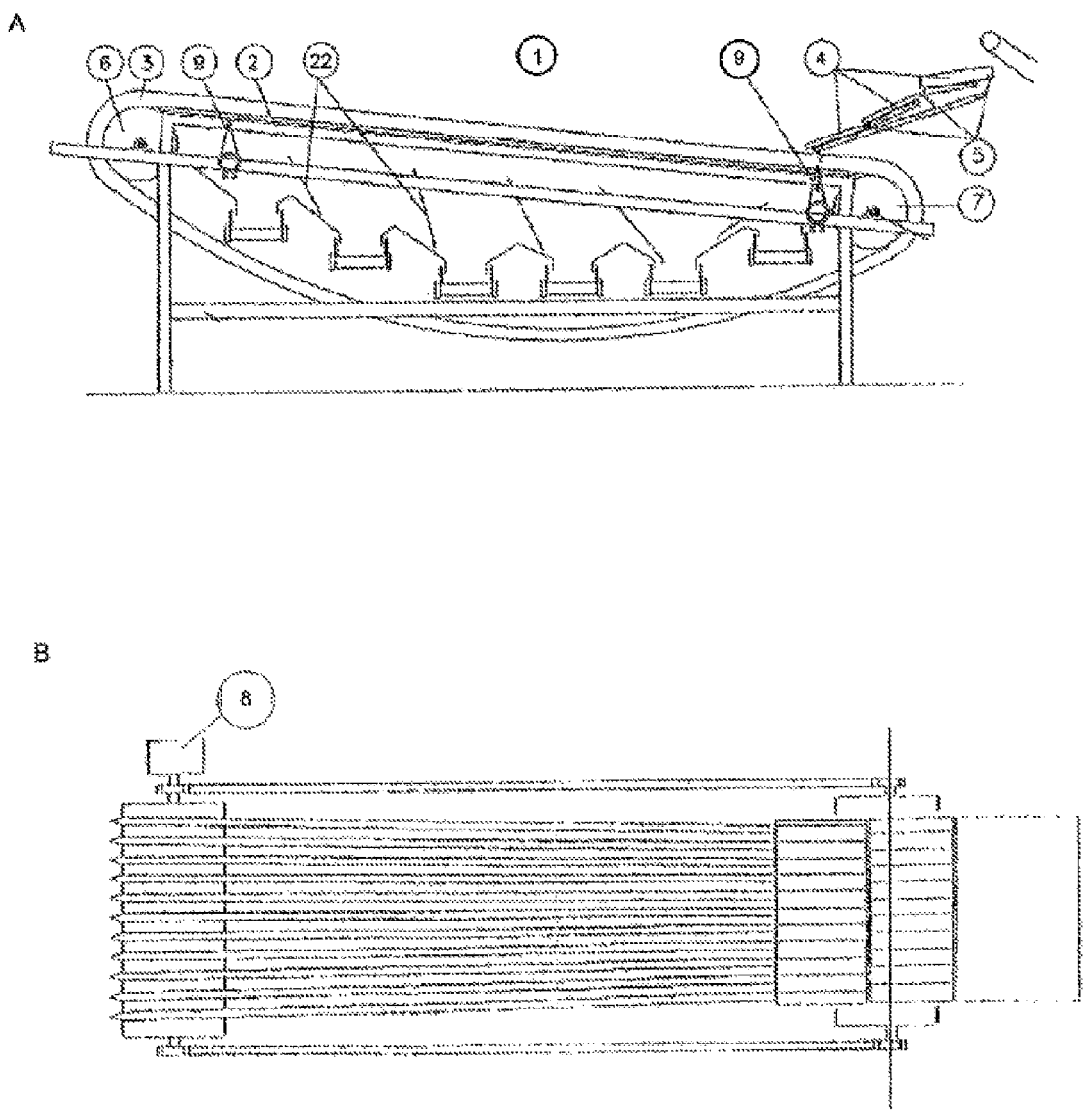
FIG. 1. Showing the equipment designed for the grading of smaller fish species and relatively light objects.

FIG. 1 shows a side-view of the grading device (1). In FIG. 1A the objects to be graded are placed onto an in-feed device (step-channel) (4). As the objects slide downwards, they assume the optimal position before sliding onto the ridge-belts (3). If the objects are not adversely affected by contact with water, a water-pipe (5) is used to direct a film of water onto the step-channel, which makes the objects quicker to assume the optimal position. The gradient of the step-channel (4) is set so that the speed of the objects as they enter the grading gaps is as close as possible to the speed of the ridge-belts. The ridge-belts (3) run along guide-rails (2) and the guide-rails (2) rest on the adjusting device (9) attached to an adjusting screwing shaft. The number of ridge-belts may be from 2 to over 30 according to the processing rate required of the grader. The guides are shown with an upward incline in the figure, but they may be horizontal or inclined downwards, depending on what is found suitable at any given time. Between the ridge-belts (3) are formed the grading gaps, the number of which is one fewer than the number of ridge-belts. Below the ridge-belts (3) are cross-plates (12) for guiding and dividing graded objects between size categories.

The ridge-belts (3) as driven by the drive drum (6), frictional resistance between the drum and the belts being sufficient to drive the belts; if it is not sufficient, e.g. in the case of long machines or heavy items, then the drum is covered with object with a high friction resistance or with pins which engage in the ridges and so drive them. Drum (7) is a free drum which guides the belts into the guide slots in the belt guides.

In FIG. 1B, a light-construction grading machine seen from above, showing the motor (8) which drives the drive drum. It is desirable that the motor should be speed-adjustable, but whether it is a hydraulic motor or an electric motor is immaterial. A gear motor may be used after the machine has been set and the object to be graded is always of the same type. The gap width on the in-feed end is narrower than on the outlet end.

Figure 2:
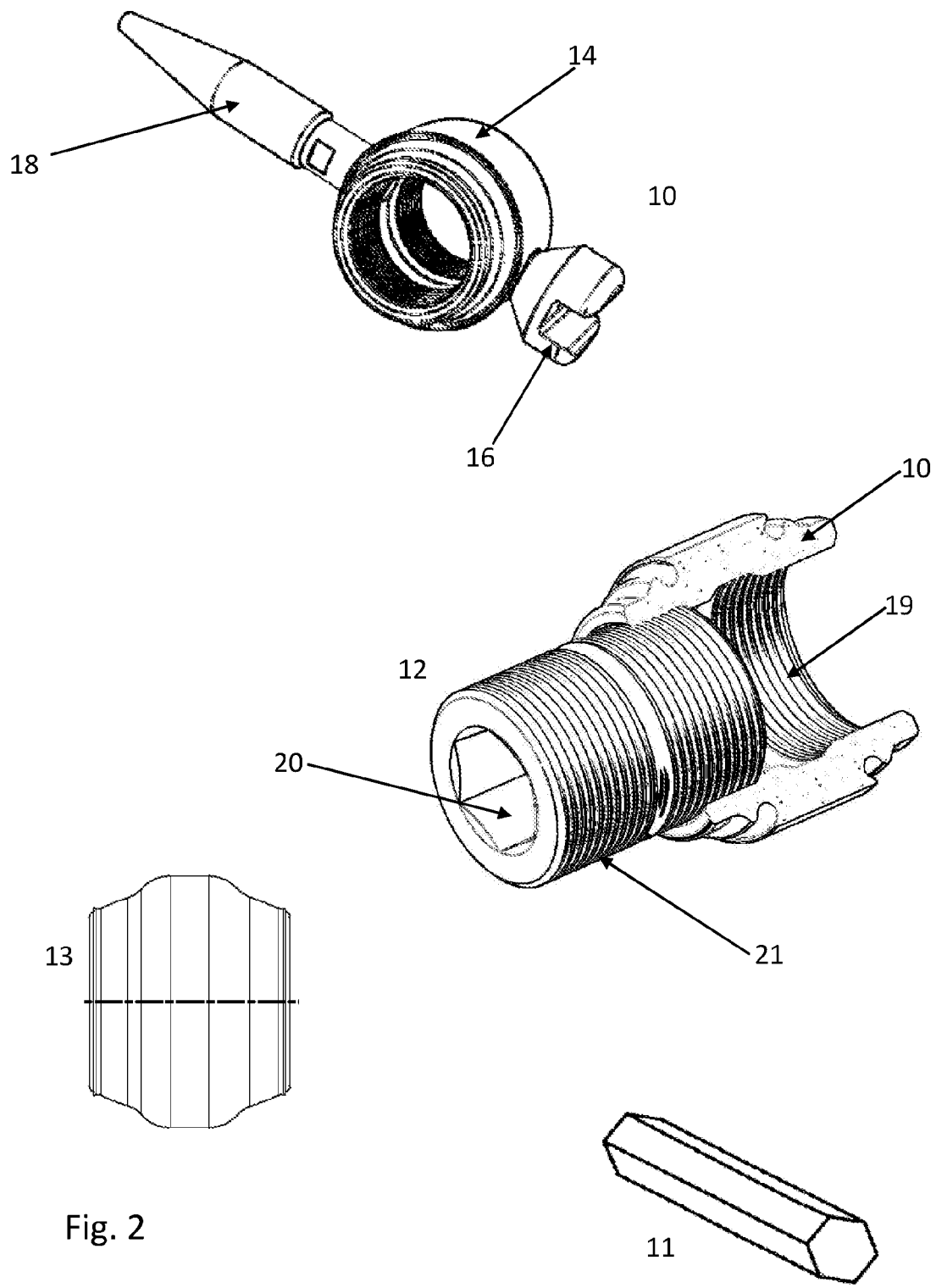
FIG. 2. Shows the individual components of the adjusting means of the present invention.

FIG. 2 discloses the individual components of the adjusting means of the present invention, a support member (10), a adjusting screwing shaft (11), an adjusting screwing member (12) and a cover member (13). Each support member (10) comprises a first screwing section (14), a guide section (16) and a receiving supporting pin (18). The first screwing section (14) has a cylindrical shape, where the inner surface forms a screw tread structure from the centre of the cylinder and towards each opening. The guide section (16) is shown here having a recess to be placed on a guide bar. The supporting pin (18) is adapted to fit into the slot of the lower part of the guide rail.

The adjusting screwing member (12) has a circular outer structure, where the inner surface (20) has a shape corresponding to the outer circumference of the adjusting screwing shaft (11), in order to fit onto the adjusting screwing shaft (11) as assembled. The first screwing section (14) has a cylindrical shape, where the inner surface comprises an elevated portion (19), which is an elevated portion forming a screw tread structure from the centre of the cylinder and towards each opening. In the embodiment shown in FIG. 2, the inner surface shape is hexagonal, corresponding to the shape of the adjusting screwing shaft of this particular embodiment. The circular outer structure of the adjusting screwing member (12) comprises a second screwing section (21), which is essentially an elevated portion having screw shaped form extending from the centre to each end of the circular structure.

The cover member (13) serves the purpose of covering the joining region of the support member (10) and the adjusting screwing member (12). The cover member (13) is made from elastic material such as rubber, which can stretch or be pressed together as the space between the support members is adjusted.

The shape of the adjusting screwing shaft (11) and the corresponding circumference of the inner surface of the adjusting screwing member (12) can be of any shape such as, but not limited to triangular, square, pentagonal etc. In the embodiment shown in FIG. 4, the shape of the adjusting screwing shaft (11) is hexagonal corresponding the shape of the inner surface if the adjusting screwing member (12). By using an inner circumference of a shape such as triangular, square, pentagonal and hexagonal, a grip is provided for a member (adjusting screwing shaft) so when the adjusting screwing shaft is rotated the adjusting screwing member is rotated or turned as well.

Figure 3:
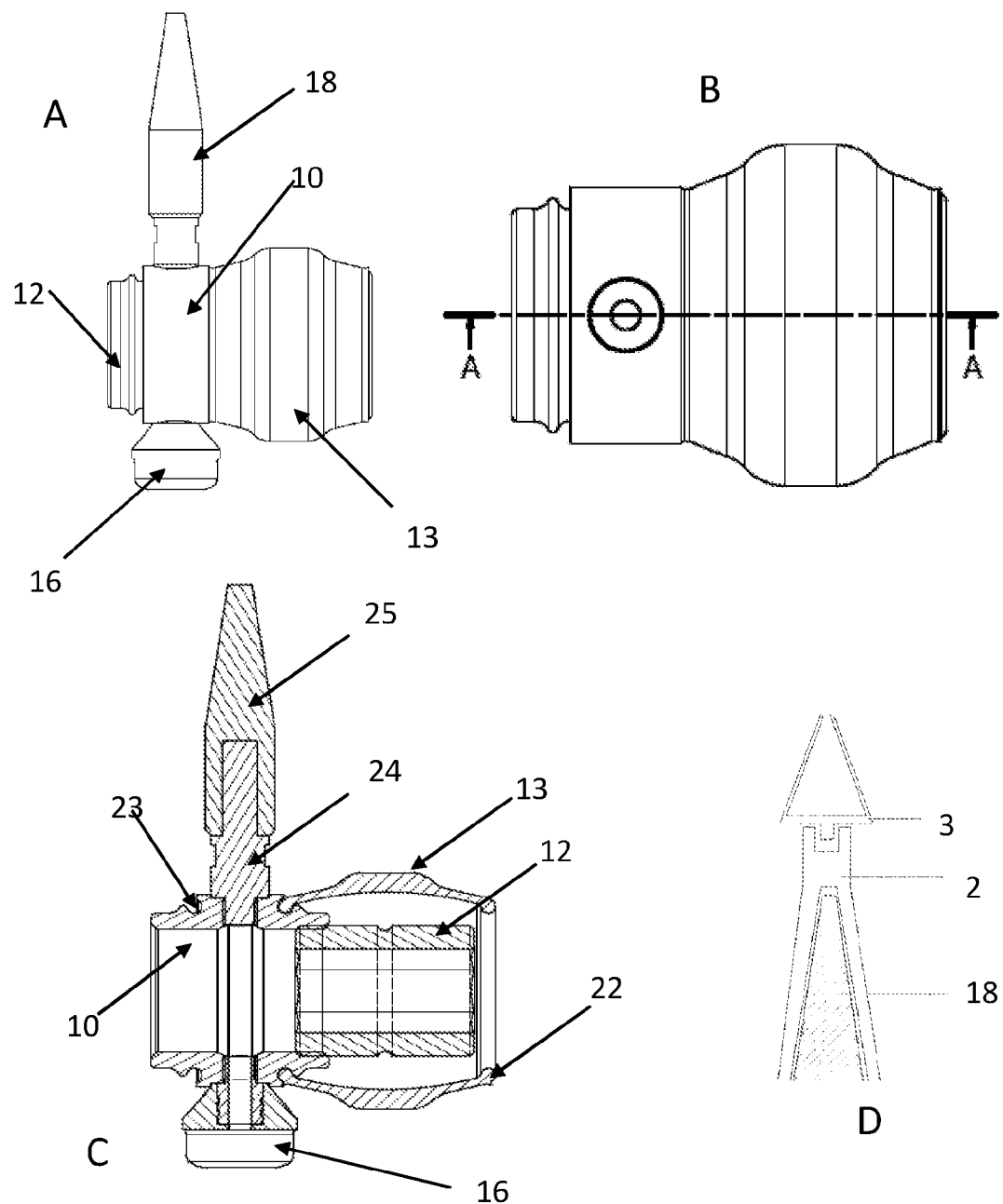
FIG. 3. Shows the support of the guide rails on the support members.

FIG. 3A shows the assembly of the individual components of the adjusting means of the present invention. The support member (10), the adjusting screwing member (12), the guide section (16) and the cover member (13), but not the adjusting screwing shaft (11). On the left side of the support member (10), the adjusting screwing member (12) is shown attached (screwed in) to the support member (10) and the supporting pin (18) extending upwardly from the support member (10). On the right side of the support member (10), the cover member is shown attached to the support member (10). FIG. 3B is a top view of FIG. 3. A indicating (line A) the transection of the drawing, which is shown in FIG. 3C. In FIG. 3C it is shown how the cover member is a pipe shaped member where the edge (22) on each side forms a protrusion or a ring with larger circumference to fit into a groove (23) on the support member to seal off the joining region of the support member (10) and the adjusting screwing member (12). FIG. 3C also shows how the supporting pin is made from two pieces, first pin 24 (in this embodiment a metal pin) screwed into the support member and a plastic cap (25) placed over the first pin for reducing wear on the ridge belts during use.

FIG. 3D shows the support of the ridge belts (3). The ridge-belts (3) run along guide-rails (2) and the guide-rails (2) rest on the supporting pin (18) of the support members (10) attached to the adjusting screwing shaft (11). There are slots in the bottom of the belt-guides, into which the support members (10) are inserted, the interval between the sides of the slots and the support members (10) being small.

Figure 4:
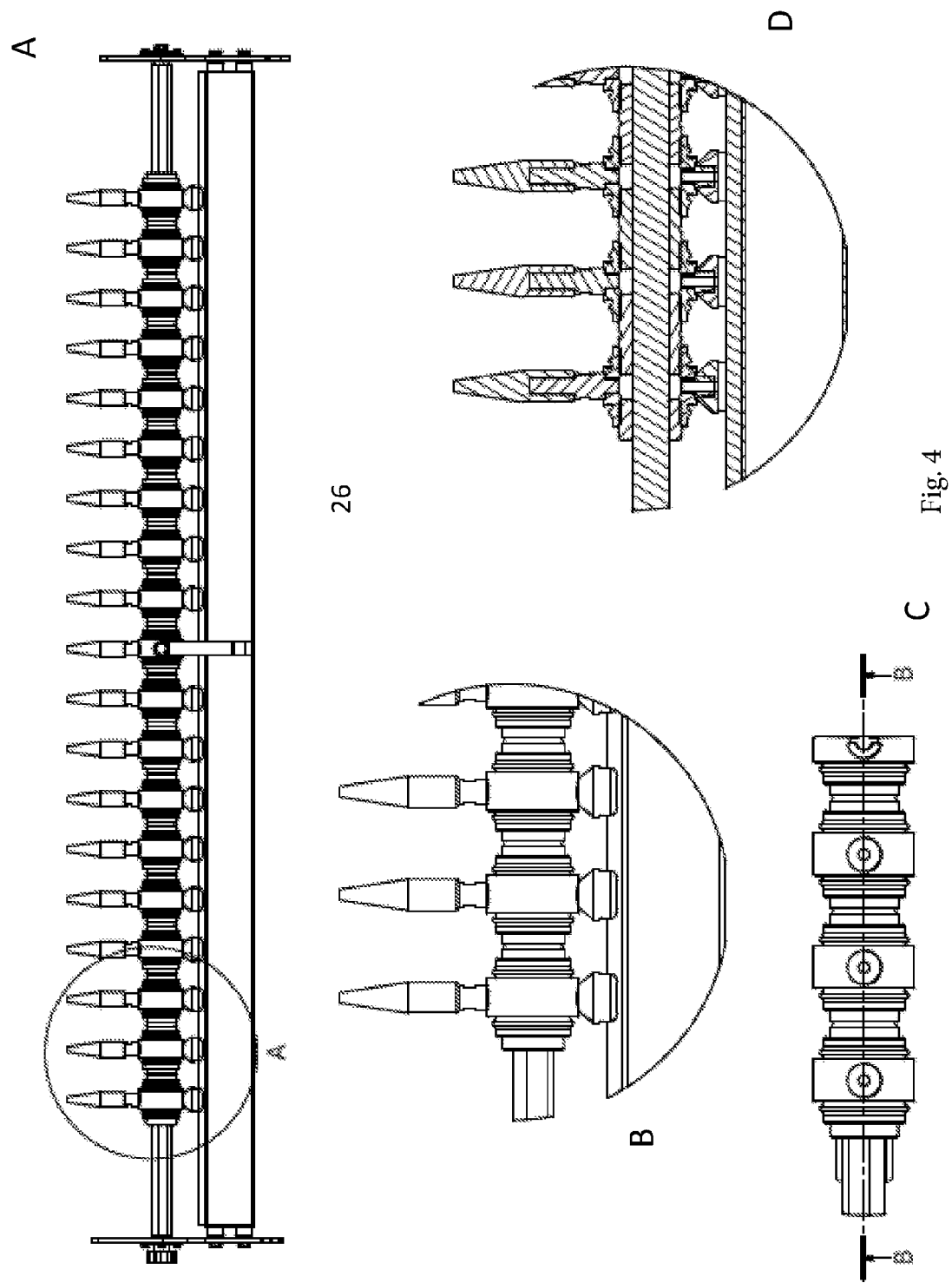
FIG. 4. Showing the mechanism for setting the gap-width on the in-feed and the outlet end of the grading device.

FIG. 4 outlines the adjusting mechanism for setting the gap-width on the in-feed and the outlet end of the grading device. What is shown is a front view (A) of the adjusting mechanism (9), an enlargement (B) of a part of the adjusting mechanism, a top view (C) of FIG. 4 B and a cross section (D) of FIG. 4C.

In FIG. 4A the adjusting screwing members (12) are positioned on adjusting screwing shaft (11) between the support members (10). The adjusting screwing members (12) are secured on the adjusting screwing shaft (11) due to the shape of the inner surface of the adjusting screwing members (12), corresponding the shape of the adjusting screwing shaft. Each screwing section (19) of the adjusting screwing member is adapted to fit into the first screwing section (14) of the support member (10), so that when the adjusting screwing shaft is turned the second screwing section of the adjusting screwing member (12) is either screwed into or out of the support member (10) and thereby altering the distance between each two support members (10). One support member (10) is provided for each ridge belt and adjusting screwing member (12), is placed between each two support members (10), on the adjusting screwing shaft (11). Each side of the row comprising support members (10) and adjusting screwing members (12) is terminated with a support member (10). Outside the support member (10) is a pressure means. A control device (26) adapted to turn the adjusting screwing shaft (11) is positioned on one side of the adjusting screwing shaft (11) behind the coil spring.

Figure 5:
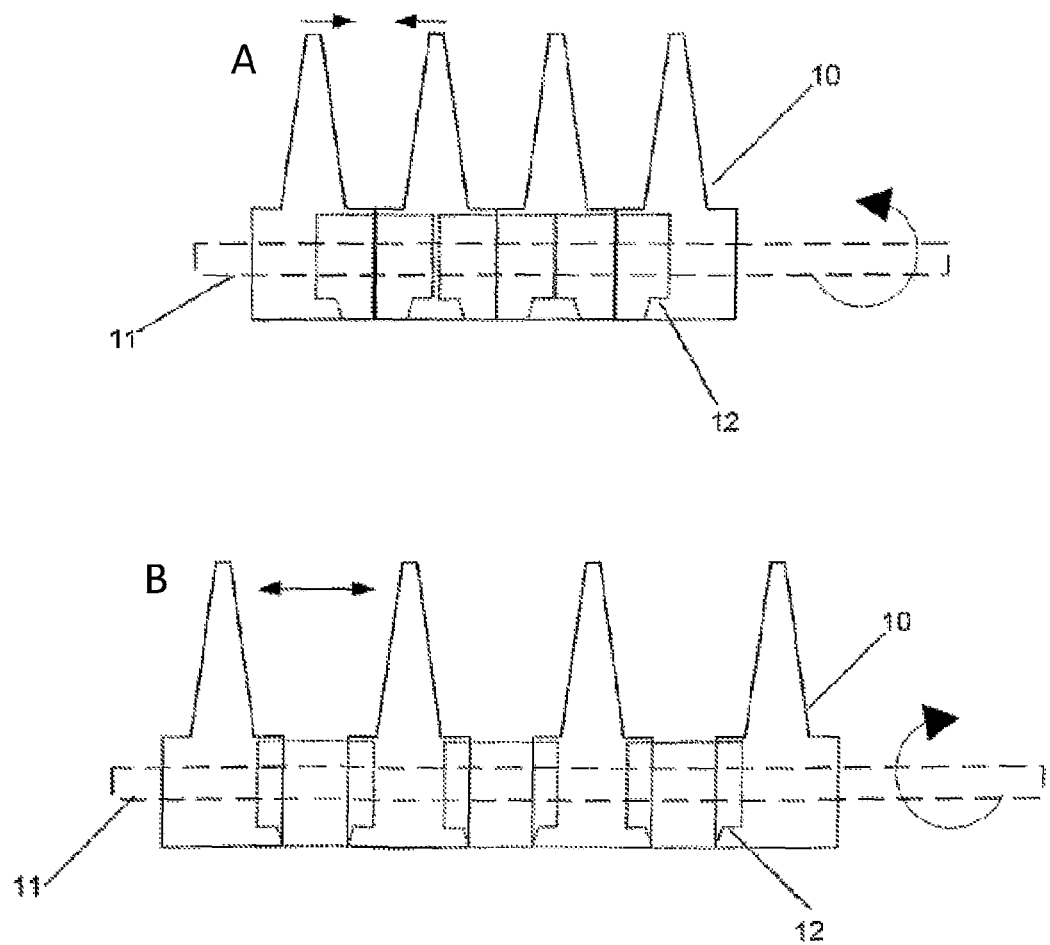
FIG. 5. Showing top, bottom and side views of the support member.

FIG. 5 is a schematic drawing of the movement of the adjustment device. In FIG. 5A the mechanism is shown as the adjusting screwing shaft (11) is turned in one direction the adjusting screwing members (12) pull the support members (10) together and the gap between them decreases. The adjusting screwing members (12) are shown as items with dotted outlines, which demonstrates that the adjusting screwing members (12) penetrate the support members (10) when they are the adjusting screwing shaft (11) is turned in this direction.

In FIG. 5B it is shown that when the adjusting screwing shaft (11) is turned in the opposite direction as compared to (B), the adjusting screwing members (12) push the support members (10) away from each other and the gap between them increases.

Figure 6:
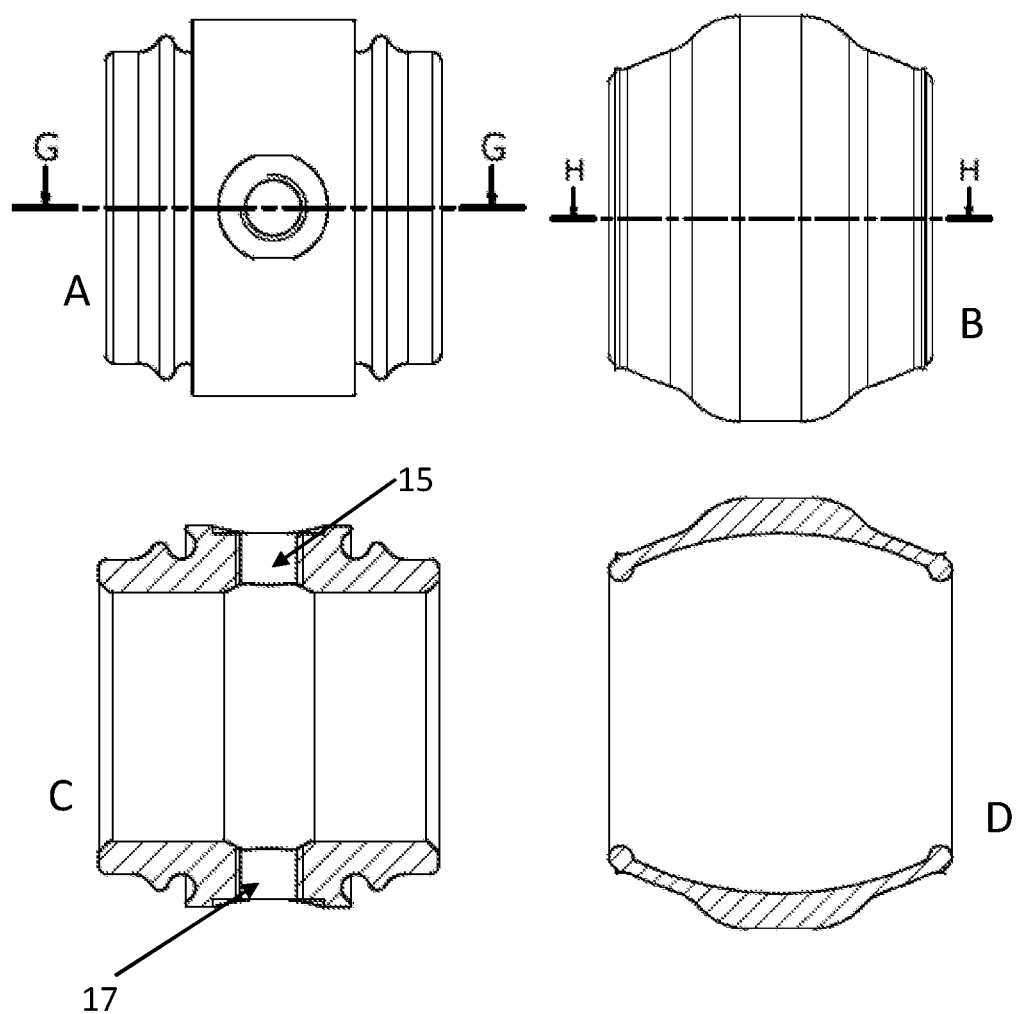
FIG. 6. Showing a top view and a transection view of the support member and the cover member FIG. 7 showing a perspective view of the individual components as assembled and a cross section of the support member.

FIG. 6 shows a top view of the support member (A) and the cover member (B) with a line indicating a transection of the support member (C) and the cover member (D) shown below. The figure shows the opening 15 for receiving the supporting pin (18) and the opening 17 for receiving the guide section 16.

Figure 7:
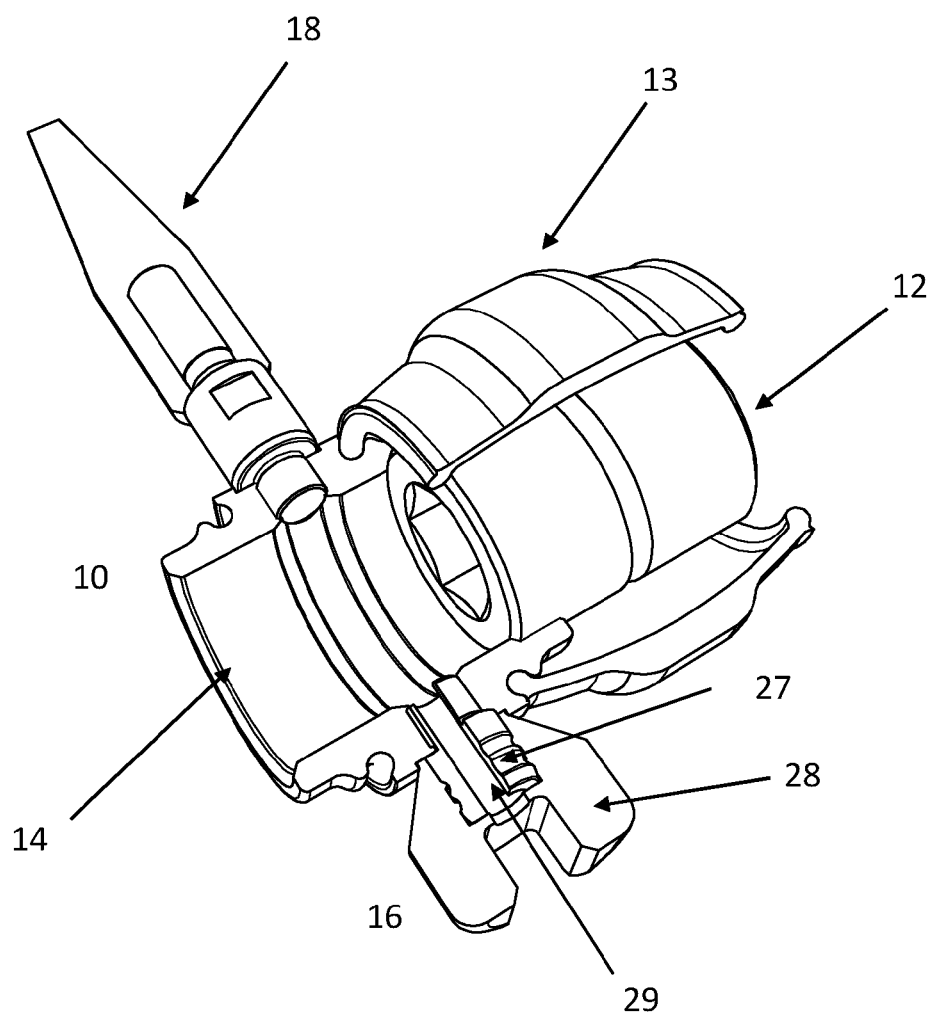

FIG. 7 shows a perspective view of the individual components and a cross section of the support member (10), comprising the first screwing section (14), the guide section (16) and the receiving supporting pin (18). The figure also shows the screwing member (12), and a cross section of the cover member (13) and the guide section (16), the guide section being formed by a hollow pin (27) screwed into the first screwing section (14) and a cap with a recess (28) placed on the hollow pin (27). An outlet (29) is therefore formed from the inner side of the first screwing section (14) through the guide section (16), but this will evacuate water from the adjusting device (mechanism) reducing humidity and making cleaning more simple and efficient.

Figure 8:
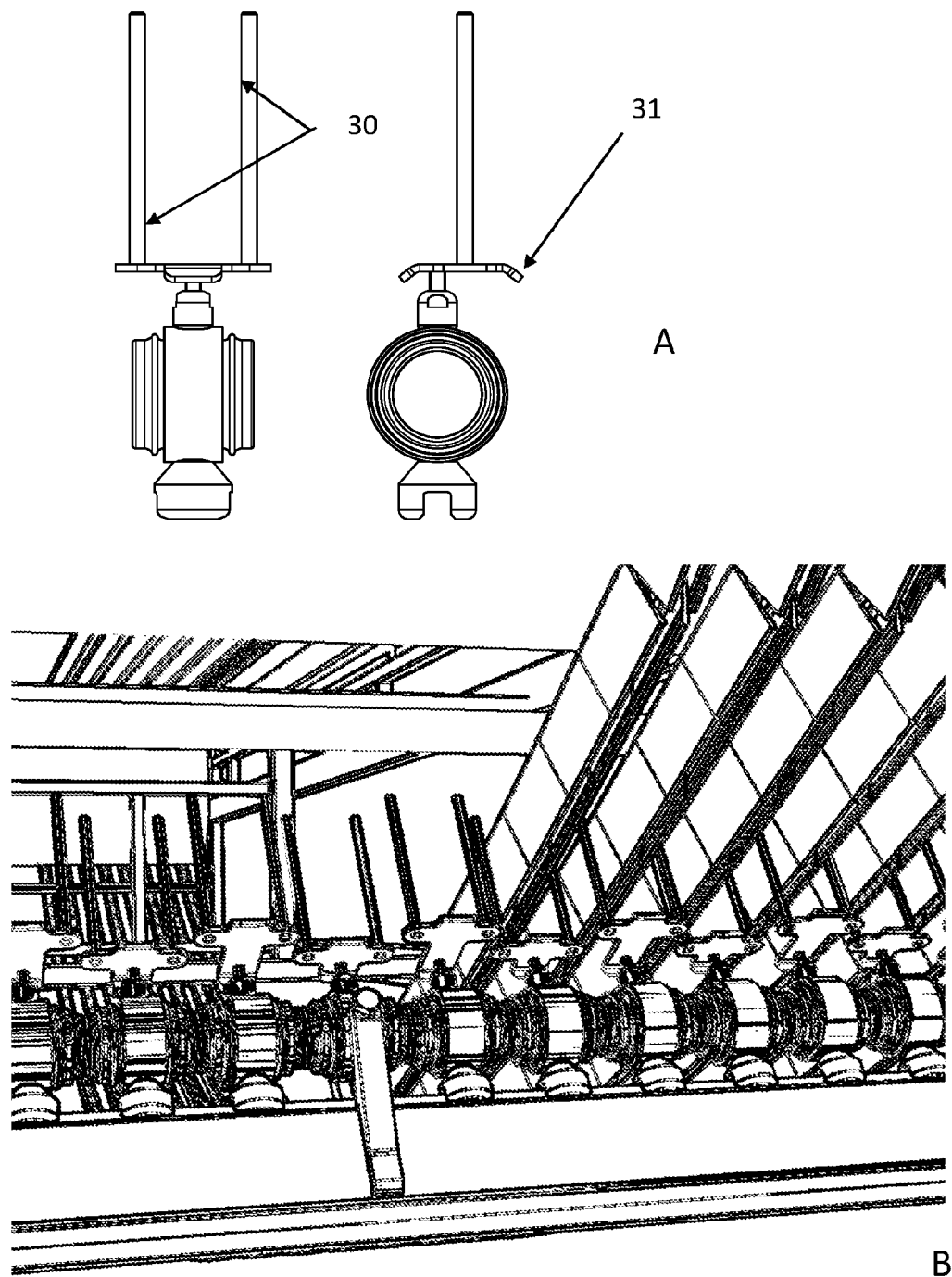
FIG. 8 showing supporting and guiding members for the ridge belt in the returning portion of the belt as well as a view under the grading device and the returning portion of the ridge belt as it rides between the two parallel pins of supporting member.

FIG. 8 shows supporting and guiding members for the ridge belt in the returning portion of the belt. FIG. 8A shows a front and a side view of a supporting member with two parallel pins 30 placed on a plate 31 on top of the first screwing section (14). FIG. 8B shows a view under the grading device and the returning portion of the ridge belt as it rides between the two parallel pins of supporting member.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus for grading sensitive products, comprising:
   an in-feed device;
   a grading unit; and
   a receiving unit,
   said grading unit comprising:
      a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into said receiving units, the ridge-belts being longitudinally supported by plurality of guide rails; and
      an adjusting device arranged underneath said ridge-belts and supporting guide rails, said adjusting device arranged for adjusting the distance between said ridge-belts, said adjusting device comprising:
         a plurality of support members, arranged in line, perpendicular underneath and corresponding to and supporting said guide rails, said support members, having further:
            a first screwing section, the first screwing section being an double action inner elevated portion of a cylinder forming a screw thread structure extending from the centre of the cylinder and towards each opening;
         a plurality of adjusting screwing members, arranged in line, perpendicular underneath said guide rails between the support members, said adjusting screwing member having:
            a second screwing section, the second screwing section being a double action outer elevated portion of a cylinder forming a screw tread structure extending from the centre of the cylinder and towards each end; and an inner hollow structure providing a grip for a penetrating shaft adapted to rotate said adjusting screwing member;

an adjusting screwing shaft, penetrating said adjusting screwing member having a shape corresponding to the circumference of the inner hollow structure of the adjusting screwing member; and a cover portion, said cover portion being a pipe shaped member having an edge on each side forms a protrusion or a ring with larger circumference to fit into a groove on the support member to seal off the joining region of the support member and the adjusting screwing member, wherein said second screwing section interacts with said first screwing section of the support members upon rotation of said adjusting screwing shaft in a manner increasing or decreasing the distance between adjacent support members and thereby said guide rails and said rigid belts.

2. The apparatus according to claim 1, wherein the support members further comprise:

a guide section securing the support member in an upright position, and a receiving section for receiving the guide rails.

3. The apparatus according to claim 2, wherein the receiving section is a supporting pin forming the supporting portion of the support members and having a shape corresponding the guide rails.

4. The apparatus according to claim 2, wherein the support pin is a metal pin screwed into the support members and a cap is placed over the first pin.

5. The apparatus according to claim 2, wherein the guide section comprises a hollow pin screwed into the first screwing section and a cap with a recess placed on the hollow pin.

6. The apparatus according to claim 5, wherein the hollow pin comprises an outlet from the inner side of the first screwing section through the guide section.

7. The apparatus according to claim 5, wherein the cap of the guide section is relatively short and wide, to reduce the space between a guide bar and the cover member.

8. The apparatus according to claim 1, wherein a pressure means on each end of the adjusting screwing shaft adapted for applying pressure on a setting mechanism from both sides.

9. The apparatus according to claim 8, wherein the pressure means is a coil spring or a spiral.

10. The apparatus according to claim 8, wherein the pressure means is an electrical jack or a hydraulic jack.

11. The apparatus according to claim 1, wherein a control device attached to the adjustment pin is adapted for turning the adjusting screwing shaft.

12. The apparatus according to claim 11, wherein the control device is a motor.

13. The apparatus according to claim 1, wherein the adjusting device is controlled by an industrial computer.

14. The apparatus according to claim 1, wherein an additional adjusting device is arranged under the returning portion of the ridge-belts.

15. The apparatus according to claim 14, wherein the receiving section comprises two parallel pins placed on a plate on top of the first screwing section, supporting the ridge-belts in the returning direction.

16. A method for adjusting the gap width between ridge-belts of a grading device, the method comprising:

providing the apparatus of claim 1; and adjusting the gap width between the ridge-belts by the adjusting device in that first screwing section of the support member is adapted to fit second screwing section of the adjusting screwing member on each side of the adjusting screwing member, and pressure means on each end of the adjusting screwing shaft adapted for applying pressure on the adjusting device from both sides when the adjusting screwing shaft is rotated in a manner increasing or decreasing the distance between adjacent support members and thereby said guide rails and said rigid belts.

17. The method according to claim 16, wherein one or more adjusting devices can be implemented on the grading apparatus, at the intake end and the outlet end of the grading apparatus.

18. The method according to claim 16, wherein a control device is attached to the adjusting screwing shaft so that when the shaft is turned, the gap width is evenly adjusted.

19. The method according to claim 16, wherein a control mechanism is implemented, the control mechanism comprising:

a pressure means, as the pressure means comprising an electrical jack or a hydraulic jack;

a motor; and a control board, wherein the gap with is controlled on the control board, which co-ordinates the turning of the adjusting screwing shaft by the motor and the pressure applied by the electrical jack or the hydraulic jack.

* * * * *